United States Patent
Tanaka

(10) Patent No.: US 9,391,446 B2
(45) Date of Patent: Jul. 12, 2016

(54) ELECTRIC POWER CONTROL APPARATUS, ELECTRIC POWER CONTROL METHOD, ELECTRONIC POWER CONTROL PROGRAM, AND RECORDING MEDIUM

(75) Inventor: Hideyuki Tanaka, Osaka (JP)

(73) Assignee: SHARP KABUSHIKI KAISHA, Osaka-Shi, Osaka (JP)

(*) Notice: Subject to any disclaimer, the term of this patent is extended or adjusted under 35 U.S.C. 154(b) by 634 days.

(21) Appl. No.: 13/878,430

(22) PCT Filed: Nov. 10, 2011

(86) PCT No.: PCT/JP2011/076007
§ 371 (c)(1),
(2), (4) Date: Apr. 9, 2013

(87) PCT Pub. No.: WO2012/070404
PCT Pub. Date: May 31, 2012

(65) Prior Publication Data
US 2013/0193776 A1    Aug. 1, 2013

(30) Foreign Application Priority Data
Nov. 25, 2010   (JP) ................................. 2010-263001

(51) Int. Cl.
*H02H 9/00*    (2006.01)
*H04W 52/02*   (2009.01)

(52) U.S. Cl.
CPC ............ *H02H 9/00* (2013.01); *H04W 52/0261* (2013.01); *Y02B 60/50* (2013.01)

(58) Field of Classification Search
CPC .. H02H 9/00; H02H 7/0852; H04W 52/0261; Y02B 60/50
See application file for complete search history.

(56) References Cited

U.S. PATENT DOCUMENTS

| 5,339,099 | A  | * | 8/1994  | Nureki ...................... B41J 2/365 347/180 |
| 5,476,672 | A  |   | 12/1995 | Kim |
| 6,109,784 | A  | * | 8/2000  | Weiss ....................... G01K 7/42 374/164 |
| 6,304,824 | B1 | * | 10/2001 | Bausch ..................... G06F 1/26 327/513 |
| 2004/0104709 | A1 |   | 6/2004 | Yamaji et al. |
| 2006/0082346 | A1 |   | 4/2006 | Nagasawa |

(Continued)

FOREIGN PATENT DOCUMENTS

| JO | 2010-188156 A | 9/2010 |
| JP | 5-260891 A    | 10/1993 |

(Continued)

OTHER PUBLICATIONS

Chinese Office Action dated Oct. 8, 2014 issued in related Chinese Application No. 201180048952.5 with an English Translation.

(Continued)

*Primary Examiner* — Zeev V Kitov
(74) *Attorney, Agent, or Firm* — Birch, Stewart, Kolasch & Birch, LLP

(57) ABSTRACT

An electric power control section includes: a temperature detecting section for detecting temperatures of a battery; and an accumulation counter for accumulating numerical values assigned to the respective temperatures of the battery which have been detected by the temperature detecting section. The electric power control section reduces electric power supply to an LCD display section when an accumulated value obtained by the accumulation counter exceeds a preset value.

4 Claims, 14 Drawing Sheets

(56) References Cited

U.S. PATENT DOCUMENTS

| | | | | |
|---|---|---|---|---|
| 2007/0234748 | A1* | 10/2007 | Alvord | F25D 21/006 62/150 |
| 2009/0252521 | A1* | 10/2009 | Takami | G03G 15/80 399/69 |

FOREIGN PATENT DOCUMENTS

| | | |
|---|---|---|
| JP | 2003-223937 A | 8/2003 |
| JP | 2006-115654 A | 4/2006 |
| JP | 2007-281911 A | 10/2007 |
| JP | 2009-089039 A | 4/2009 |
| JP | 2010-124246 A | 6/2010 |

OTHER PUBLICATIONS

Ma Weihua "Application of Embedded System in the Instrument of Flow Volume and Accumulative Volume for Thermal Power Plants" Automation of Electric Power Systems, No. 4, vol. 27, pp. 69-71 and 76, Feb. 25, 2003.

* cited by examiner

FIG. 4

Accumulation Counter
Weighting For Luminance MIN

| Battery Temperature (°C) | Counter Weight |
|---|---|
| T13 | 5400 |
| T12 | 5400 |
| T11 | 5400 |
| T10 | 5400 |
| T9 | 5400 |
| T8 | 5400 |
| T7 | 50 |
| T6 | 20 |
| T5 | 7.5 |
| T4 | 3 |
| T3 | 1.5 |
| T2 | 1 |
| T1 | 0 |
| T0 | 0 |

(Every 5 Seconds)

FIG. 7

Accumulation Counter
Weighting For Charging/Feeding Stop

| Battery Temperature (°C) | Counter Weight |
|---|---|
| Tb14 | 5400 |
| Tb13 | 5400 |
| Tb12 | 5400 |
| Tb11 | 5400 |
| Tb10 | 5400 |
| Tb9 | 5400 |
| Tb8 | 5400 |
| Tb7 | 100 |
| Tb6 | 40 |
| Tb5 | 15 |
| Tb4 | 6 |
| Tb3 | 3 |
| Tb2 | 2 |
| Tb1 | 0 |
| Tb0 | 0 |

(Every 10 Seconds)

FIG. 11

Sampling Time Weighting For Luminance MIN

| Battery Temperature (°C) | Sampling Time (Second) |
|---|---|
| Tc11 | 1 |
| Tc10 | 1 |
| Tc9 | 1 |
| Tc8 | 1 |
| Tc7 | 1 |
| Tc6 | 1 |
| Tc5 | 10 |
| Tc4 | 27 |
| Tc3 | 72 |
| Tc2 | 180 |
| Tc1 | 360 |
| Tc0 | 540 |

(Accumulation Counter Value +10)

FIG. 13

Sampling Time And Accumulation Counter
Weighting For Charging/Feeding Stop

| Battery Temperature (°C) | Counter Weight | Sampling Time (Second) |
|---|---|---|
| Td14 | 5400 | 1 |
| Td13 | 5400 | 1 |
| Td12 | 5400 | 1 |
| Td11 | 5400 | 1 |
| Td10 | 5400 | 1 |
| Td9 | 5400 | 1 |
| Td8 | 5400 | 1 |
| Td7 | 37 | 2 |
| Td6 | 39 | 5 |
| Td5 | 42 | 30 |
| Td4 | 45 | 60 |
| Td3 | 48 | 300 |
| Td2 | 50 | 540 |
| Td1 | 0 | 900 |
| Td0 | 0 | 900 |

ELECTRIC POWER CONTROL APPARATUS, ELECTRIC POWER CONTROL METHOD, ELECTRONIC POWER CONTROL PROGRAM, AND RECORDING MEDIUM

TECHNICAL FIELD

The present invention relates to an electric power control apparatus for controlling electric power to be supplied to a device.

BACKGROUND ART

In recent years, devices such as a mobile phone and an information processing terminal have been more and more multifunctional, whereas the devices that are being used have been increasing in surface temperature as they are smaller in size and larger in battery capacity.

In particular, such a device, which may be used for a long time while being held directly by a user, may cause a low-temperature burn depending on a surface temperature.

Thus, various techniques have been proposed for preventing a low-temperature burn caused by a device.

For example, Patent Literature 1 discloses a technique for controlling electric power and a temperature by electric power control triggered by a constant temperature threshold.

Patent Literature 2 discloses an electric power control technique for preventing a low-temperature burn by concurrently detecting whether or not a device is being touched with a human body.

Patent Literature 3 discloses a technique for carrying out warning control with respect to a user of a device, assuming, from a trace of a rise in temperature of the device, that the device is placed in a sealed environment.

CITATION LIST

Patent Literature

Patent Literature 1

Japanese Patent Application Publication, Tokukai, No. 2003-223937 (Publication Date: Aug. 8, 2003)

Patent Literature 2

Japanese Patent Application Publication, Tokukai, No. 2010-124246 (Publication Date: Jun. 3, 2010)

Patent Literature 3

Japanese Patent Application Publication, Tokukai, No. 2009-89039 (Publication Date: Apr. 23, 2009)

SUMMARY OF INVENTION

Technical Problem

However, according to the technique described in Patent Literature 1, in a case where a temperature threshold is lowered in view of a risk of causing a low-temperature burn, there is a problem such that user's convenience may be lost since even a short-time operation which has no risk limits a temperature.

According to the technique described in Patent Literature 2, in addition to a problem of necessity for a function of determining whether or not a device is being touched with a human body, there is a problem such that a touch to a part of the device other than a touch sensor section makes it impossible to carry out control. In other words, the touch sensor section needs to be touched with a human body, and no temperature control is carried out in a case where the touch sensor section is not touched with the human body. Therefore, if a part of the device other than the touch sensor section which part is high in surface temperature is being touched with a human body, a low-temperature burn may develop.

Further, according to the technique described in Patent Literature 3, in case of using a function such as a digital recording function which is required to be carried out at a powerful electric current, the trace of the rise in temperature becomes steep. This causes a problem such that it is impossible to differentiate such a case from a case where the device is placed in the sealed environment. In other words, even in a case where there is no risk of a low-temperature burn, the device falsely carries out a detection and consequently carries out warning control with respect to a user of the device.

The present invention has been accomplished in view of the problems, and an object of the invention is to provide an electric power control apparatus capable of surely preventing a low-temperature burn without losing user's convenience.

Solution to Problem

An electric power control apparatus of the present invention for controlling electric power supply to a device, includes: temperature detecting means for detecting temperatures of the device; and accumulation means for accumulating numerical values assigned to the respective temperatures of the device which have been detected by the temperature detecting means, the electric power control apparatus reducing the electric power supply to the device when an accumulated value obtained by the accumulation means exceeds a preset value.

An electric power control method for controlling electric power supply to a device, comprising the steps of: (a) detecting temperatures of the device; (b) accumulating numerical values assigned to the respective temperatures of the device which have been detected by the step (a); and (c) carrying out electric power control for reducing or stopping the electric power supply to the device when an accumulated value obtained by the step (b) exceeds a preset value.

Note here that the accumulated value obtained by accumulating numerical values assigned to the respective detected temperatures of the device increases as time passes. This indicates an increase in load caused by a surface temperature of the device on a user who touches the device.

Accordingly, the above configuration in which control for reducing electric power supply to the device is carried out when the accumulated value obtained by accumulating the numerical values assigned to the respective detected temperatures of the device exceeds a preset value makes it possible to reduce a load caused by a surface temperature of the device on a user who touches the device.

For example, assuming that the preset value is a value which may cause a user to suffer a low-temperature burn, it is possible to prevent a user touching the device from suffering a low-temperature burn.

According to the electric power control with the above configuration, in a case where a user may suffer a low-temperature burn, electric power supply is merely reduced. Therefore, a stop of electric power supply to the device would not bring about a situation in which user's convenience is lost.

As described earlier, with the configuration, it is possible to surely prevent a low-temperature burn without losing user's convenience.

Advantageous Effects of Invention

The present invention, which is an electric power control apparatus for controlling electric power supply to a device, including: temperature detecting means for detecting temperatures of the device; and accumulation means for accumulating numerical values assigned to the respective temperatures of the device which have been detected by the temperature detecting means, the electric power control apparatus reducing the electric power supply to the device when an accumulated value obtained by the accumulation means exceeds a preset value, brings about an effect of surely preventing a low-temperature burn without losing user's convenience.

BRIEF DESCRIPTION OF DRAWINGS

FIG. 4 is a table of accumulation counter weighting for luminance MIN.

FIG. 7 is a table of accumulation counter weighting for stopping charging/feeding.

FIG. 11 is another table of accumulation counter weighting for luminance MIN.

FIG. 13 is another table of accumulation counter weighting for stopping charging/feeding.

DESCRIPTION OF EMBODIMENTS

The following will discuss an embodiment of the present invention. Note that the present embodiment describes an example of application of an electric power control apparatus of the present invention to a mobile phone.

<Schematic Explanation of Mobile Phone>

Figure 2:
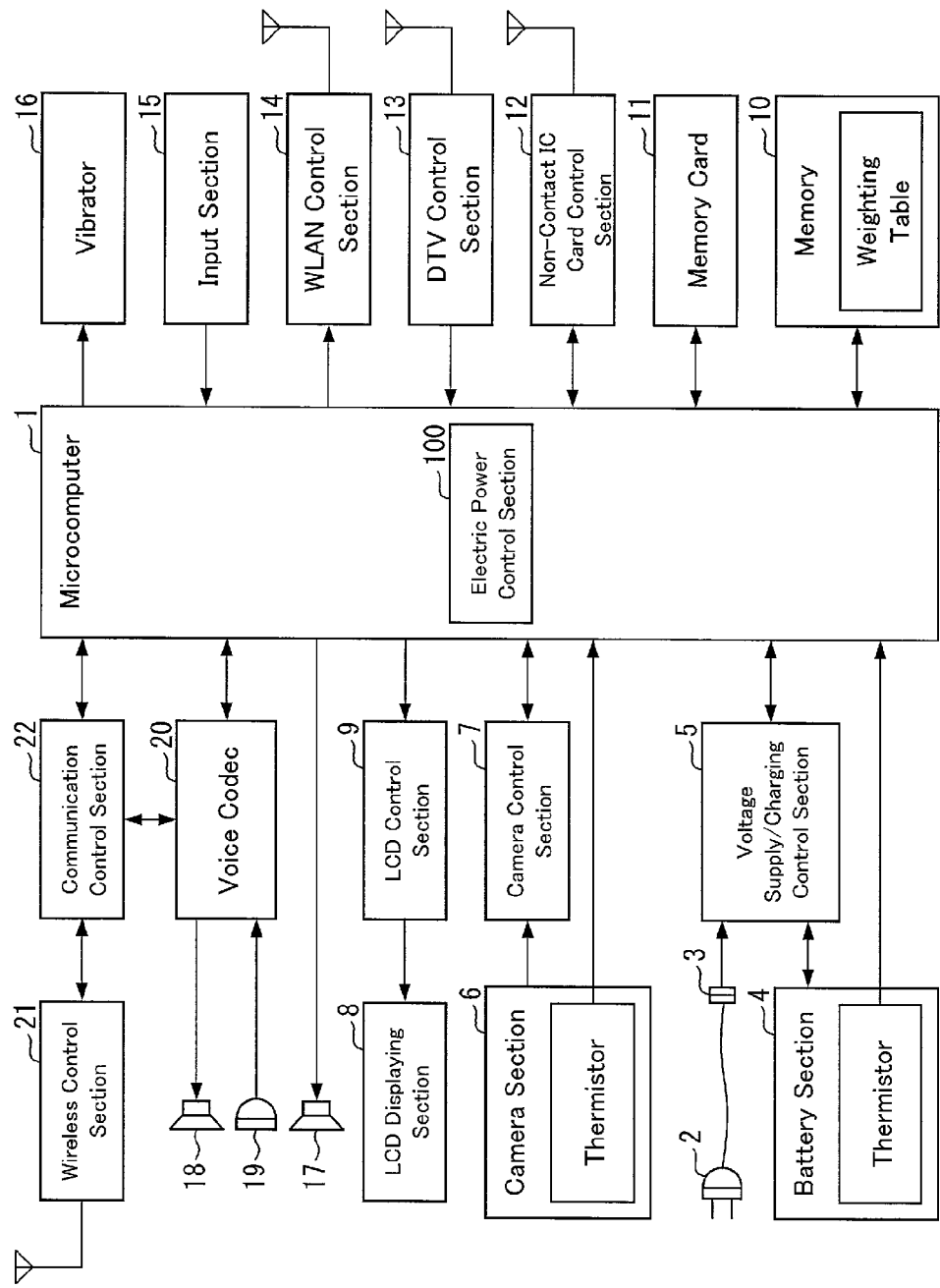
FIG. 2 is a block diagram schematically illustrating a configuration of a mobile phone in accordance with the present embodiment.

FIG. 2 is a block diagram schematically illustrating a configuration of a mobile phone of the present embodiment.

As shown in FIG. 2, the mobile phone includes a microcomputer 1 which is a CPU for controlling of an entire device, an external feeding cable 2, a USB (Universal Serial Bus) connector 3 for connecting the external feeding cable 2, a battery section 4 (a thermistor built-in battery), a voltage supply/charging control section 5 for controlling voltage supply and charging, a camera section 6 (a thermistor built-in camera module), a camera control DSP (Digital Signal Processor) 7, a display LCD (Liquid Crystal Display) 8, a LCD control section 9, a built-in memory 10 in which a weighting table is recorded, an external memory card 11, a non-contact IC card control section 12, a one-segment DTV (Digital Signal Television) module 13, a WLAN (Wireless Local Area Network) control module 14, a key and touch panel input section 15, a vibrator 16, an external speaker 17, a handset receiver 18, a handset microphone 19, a voice codec IC 20, a wireless control module 21, and a communication control section 22.

The mobile phone with the configuration also includes an electric power control function by a temperature accumulation counter. This power control function is carried out by an electric power control section (an electric power control apparatus) 100 provided in the microcomputer 1.

Further, the mobile phone with the configuration at least includes, as an electric power consumption mode during operation, two types of electric power modes which are (i) a normal electric power mode and (ii) an electric power saving mode. The electronic control section 100 controls the mobile phone by changing these electric power modes.

The normal electric power mode is an electric power consumption mode in which a mobile phone is normally used. For example, the normal electric power mode is a mode in which the display LCD 8 carries out a display operation at a luminance set by a user.

In contrast, the electric power saving mode is a consumption mode in which a lower amount of electric power is consumed than in the normal electric power mode. For example, the electric power saving mode is a mode in which the display LCD 8 carries out a display operation not at a luminance set by a user but at minimum luminance.

Note that the electric power saving mode does not only reduce the electric power consumption but also stops supplying electric power for charging the thermistor built-in battery 4.

<Explanation of Power Control Section>

Figure 1:
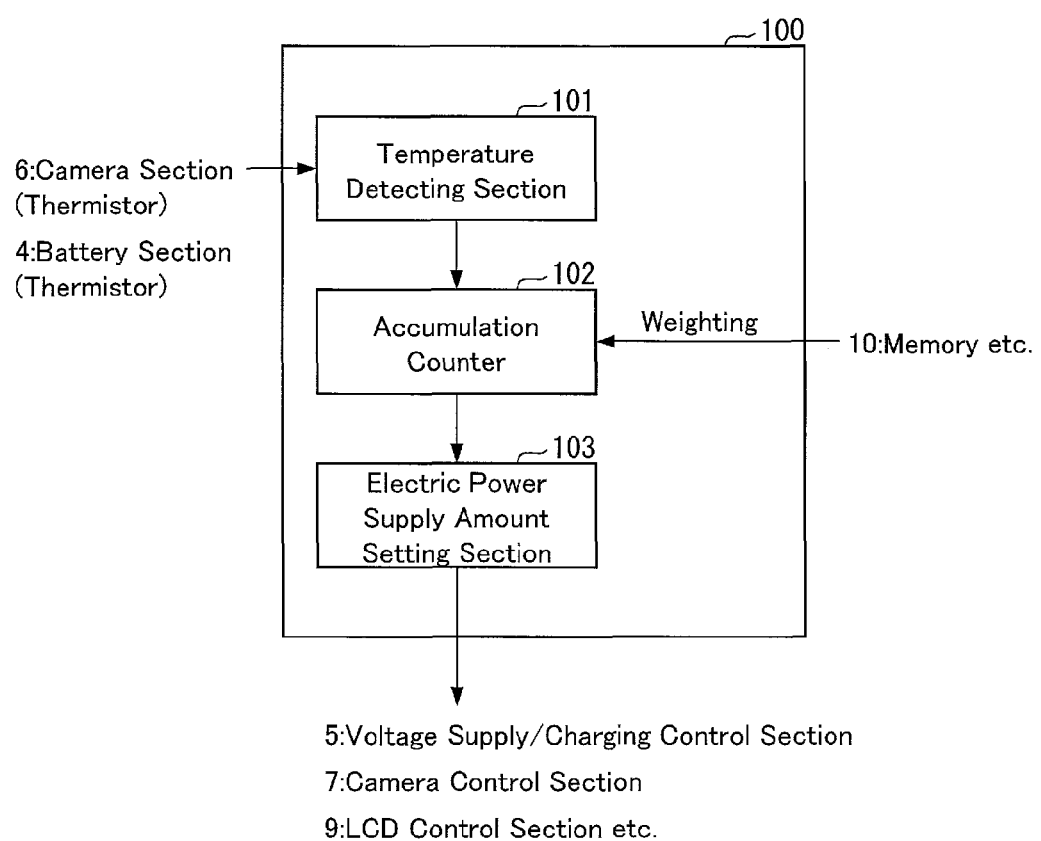
FIG. 1 is a block diagram schematically illustrating a configuration of an electric power control section of the present invention.

FIG. 1 is a block diagram schematically illustrating a configuration of the electric power control section 100.

As shown in FIG. 1, the electric power control section 100 includes a temperature detecting section (a temperature detecting means) 101, an accumulation counter (an accumulation means) 102, an electric power supply amount setting section 103.

The temperature detecting section 101 detects a temperature of the battery section 4 in accordance with a signal from the thermistor of the battery section 4, and detects a temperature of the camera section 6 in accordance with a signal from the thermistor of the camera section 6.

The accumulation counter 102 reads out, from a built-in memory 10 or the like in which a weighting table is stored, numerical values (weighted values) assigned to respective temperatures detected by the temperature detecting section 101, and then sequentially accumulates the weighted values. The weighted values thus accumulated are supplied, as an accumulation count value, to the electric power supply amount setting section 103.

The electric power supply amount setting section 103 determines whether or not the accumulation count value thus received exceeds a preset value. In a case where the accumulation count value exceeds the preset value, in order to supply electric power in a preset amount to each of sections connected to the microcomputer 1, the electric power supply amount setting section 103 supplies control signals to respective control sections connected to the respective sections.

The control signals are supplied to, for example, the voltage supply/charging control section 5, the camera control section 7, and the LCD control section 9, respectively.

The control signals are signals for changing the electric power mode, in which a mobile phone operates, from the normal electric power mode to the electric power saving mode (described earlier). The control signals contain instructions to reduce or stop electric power supply.

For example, in a case where the control signal is supplied to the voltage supply/charging control section 5, the electric power control section 100 carries out control for stopping electric power supply for charging the battery section 4. In a case where the control signal is supplied to the camera control section 7, the electric power control section 100 carries out control for stopping operation of the camera section 6. In a case where the control signal is supplied to the LCD control section 9, the electric power control section 100 carries out control with respect to a backlight for causing the luminance of the LCD display section 8 to be minimum.

<Schematic Explanation of Power Control>

Figure 3:
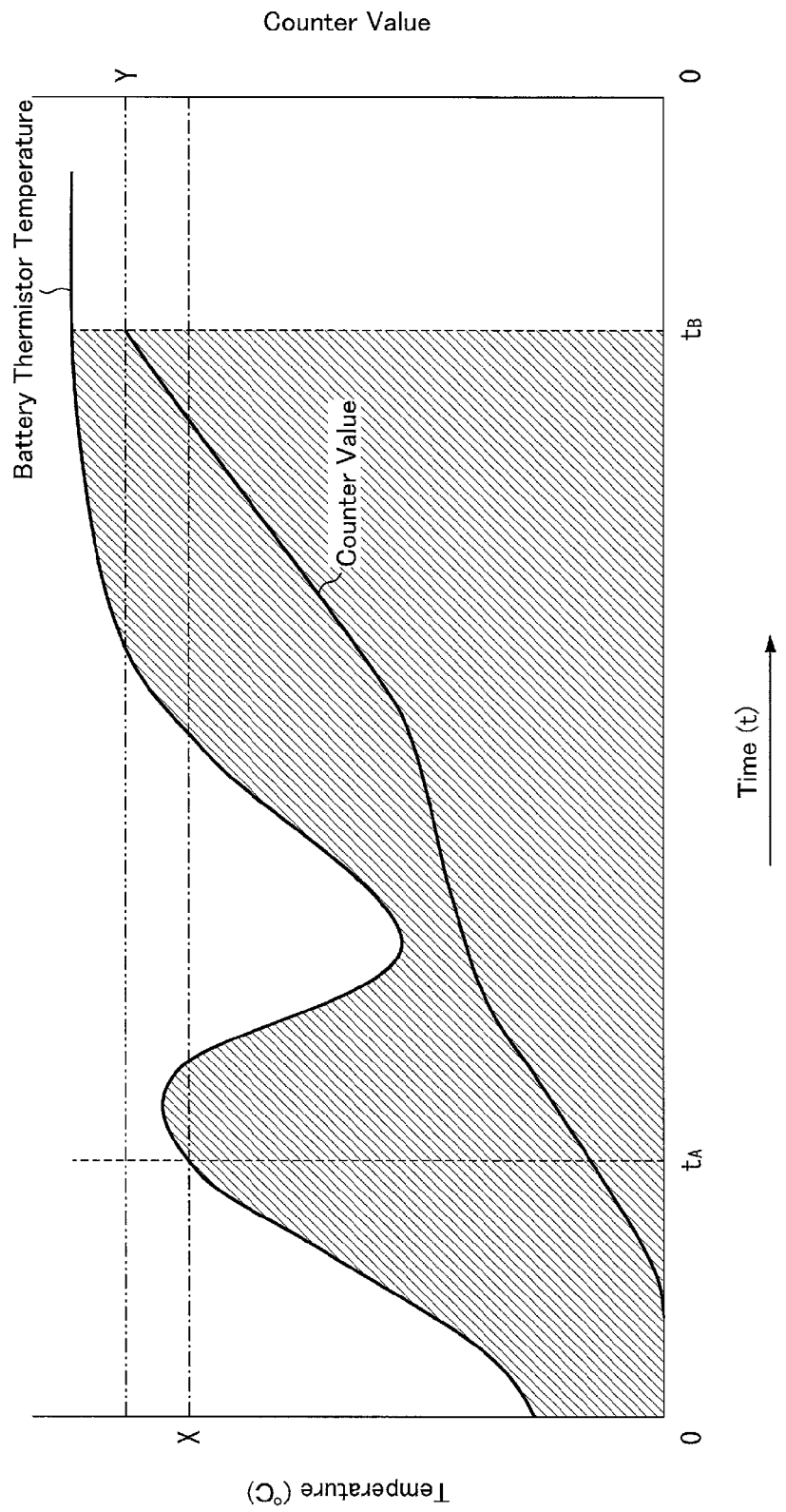
FIG. 3 is a temperature conceptual diagram for explaining a concept of electric power control carried out by the electric power control section shown in FIG. 1.

FIG. 3 is a temperature conceptual diagram for explaining a concept of electric power control by the electric power control section 100. This diagram shows an example of measurement of a temperature of the thermistor of the battery section 4 by indicating a time (t) on a horizontal axis, and a temperature (° C.) and a counter value on a vertical axis. According to conventional electric power control, in a case where a time tA has passed and then the temperature of the thermistor of the battery section 4 exceeds a threshold X, electric power supply to a device is stopped. However, this causes a problem such that for example, even in a case where a user is not yet at a risk of occurrence of a low-temperature burn when using a mobile phone, display etc. of an operating display panel of the mobile phone is stopped and thus user's convenience is lost.

However, according to the present invention, control for reducing electric power to be supplied to a device is carried out when an accumulated value obtained by accumulating numerical values assigned to respective detected temperatures of a device exceeds a preset value. Therefore, even if the temperature of the thermistor of the battery section 4 exceeds the threshold X, electric power continues to be supplied to the device provided that the accumulated value does not exceed the preset value.

According to the present invention, as shown in FIG. 3, operation of a device is not stopped until a time tB at which the counter value (accumulated value obtained by the accumulation counter 102) reaches a value Y that is set in advance. Therefore, unlike conventional electric power control, according to electric power control of the present invention, display etc. of an operating display panel of a mobile phone is not suddenly stopped before a user is at a risk of occurrence of a low-temperature burn. This brings about an effect of preventing a loss of user's convenience.

<Temperature Accumulation Counter Control Process (1)>

Figure 5:
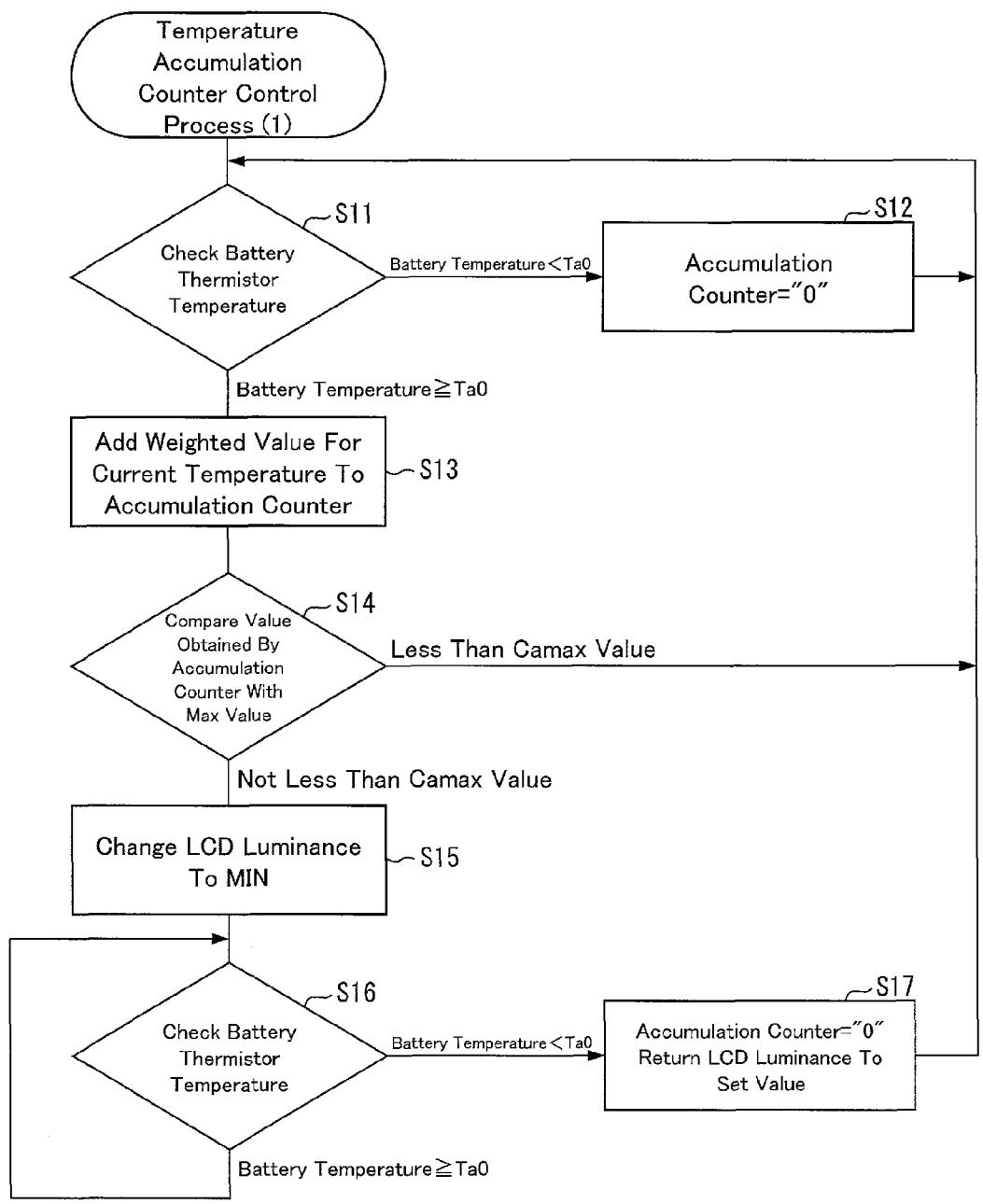
FIG. 5 is a flowchart illustrating how a temperature accumulation counter control process is carried out by use of the table shown in FIG. 4.

The following will discuss, with reference to FIGS. 4 and 5, a specific temperature accumulation counter control process carried out in the electric power control section 100. Here, control for causing the luminance of the LCD display section 8 to be minimum (MIN) is described.

FIG. 4 shows an example of weighting carried out with respect to a temperature until the LCD luminance is controlled to be minimum (MIN). Here, a table is used in which the temperature of the battery section 4 and a counter weight correspond to each other. In a case where this table is used, it is assumed that an accumulation count is carried out every 5 seconds. Note that numerical values in the table are set for each device and in view of, for example, a place in which a temperature is detected.

FIG. 5 illustrates how a process is carried out in which in response to a rise in temperature of the battery section 4 due to operation of a mobile phone, the accumulation counter 102 starts accumulating temperature damage, and then the luminance at which the LCD display section 8 carries out display is lowered to MIN when an accumulated counter value is over a given value. Such control causes a change in electric power mode from the normal electric power mode to the electric power saving mode, so that the temperature of the battery section 4 is lowered by reducing electric power consumption, that is, a temperature of the mobile phone is lowered.

First, as shown in FIG. 5, the temperature of the thermistor of the battery section 4 is checked (detected) (step S11). Here, more electric power is consumed by using a plurality of modules (the camera section 6, the LCD display section 8, etc.) of a main body of a mobile phone, and the temperature of the battery section 4 rises accordingly. Therefore, in order to check the temperature of the battery section 4, the temperature of the thermistor is checked.

As a result of the checking of the temperature of the thermistor at step S11, in a case where the temperature does not exceed a preset temperature "Ta0", a value of the accumulation counter 102 is reset to "0" (step S12). Subsequently, the process returns to step S11, at which the temperature of the thermistor of the battery section 4 is checked again.

In contrast, as a result of the checking of the temperature of the thermistor at step S11, in a case where the temperature is not less than the preset temperature "Ta0", the accumulation counter 102 adds (calculates) a weighted value for a current temperature (step S13). Here, weighted values for respective temperatures are read out from the table shown in FIG. 4, and the accumulation counter 102 accumulates the weighted values thus read out.

Subsequently, it is determined whether or not a value (an accumulated value) obtained by the accumulation counter 102 is a Max value (a Camax value) (step S14). Here, in a case where the value obtained by the accumulation counter 102 is less than the Camax value, the process returns to step S11, at which the temperature of the thermistor of the battery section 4 is checked, and then accumulation is continued.

Meanwhile, at step S14, in a case where the value obtained by the accumulation counter 102 is not less than the Camax value, a process for changing the luminance of the LCD display section 8 to MIN is carried out (step S15). Here, the electric power mode changes from the normal electric power mode to the electric power saving mode, and electric power to be supplied to the backlight is reduced so that the luminance of the LCD display section 8 becomes MIN with respect to the LCD control section 9 which controls the LCD display section 8.

Thereafter, the temperature of the thermistor of the battery section 4 is checked (step S16). As a result of the checking of the temperature of the thermistor, in a case where the temperature does not exceed the preset temperature "Ta0", the value of the accumulation counter 102 is reset to "0". Then, in order to return the luminance of the LCD display section 8 to a set value, electric power supply is increased by changing the electric power mode from the electric power saving mode to the normal electric power mode (step S17). The process returns to step S11, at which the temperature of the thermistor of the battery section 4 is checked again.

In contrast, as a result of the checking of the temperature of the thermistor at step S16, in a case where the temperature is not less than the preset temperature "Ta0", until the temperature of the thermistor becomes less than "Ta0", the checking of the temperature of the thermistor is continued while the luminance MIN of the LCD display section 8 is being maintained.

<Explanation of Change of Display State>

Figure 6:
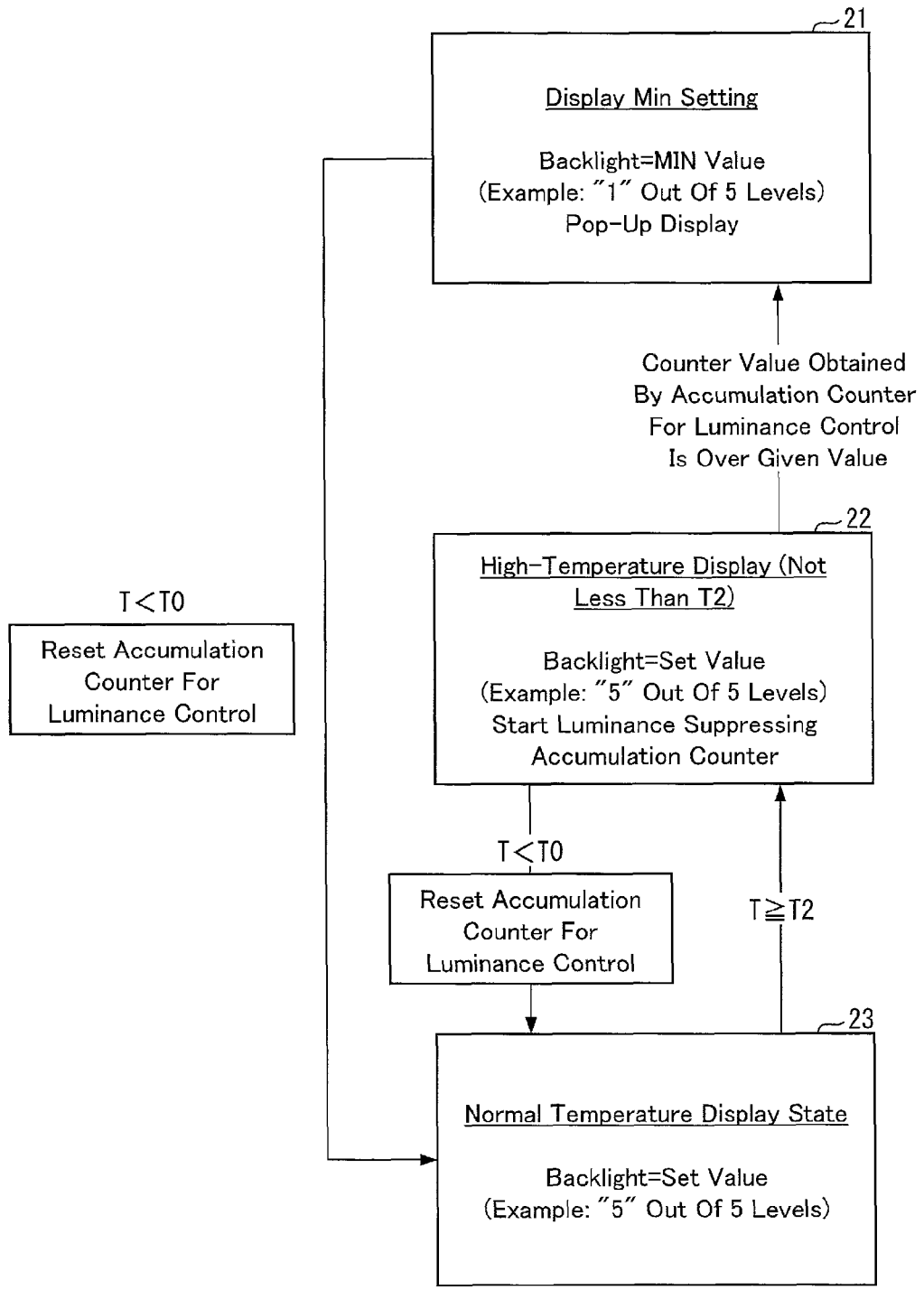
FIG. 6 illustrates a change of a display state during the temperature accumulation counter control process shown in FIG. 5.

FIG. 6 illustrates a change of a display state in the temperature accumulation counter control process.

In other words, the temperature accumulation counter control process causes the LCD display section 8 to be in any one of display states that are a normal-temperature display state 23, a high-temperature display state 22, and a display MIN setting state 21.

The normal-temperature display state 23 is a display state in the normal electric power mode. In this state, a luminance of the backlight is a set value (here, the set value is assumed to be "5" out of 5 levels). In a case where a battery thermistor temperature T becomes not less than "T2" in this state, the display state changes to the high-temperature display state 22.

The high-temperature display state 22 is a display state in the normal electric power mode and at the battery thermistor temperature T of not less than "T2". A set value of the backlight is "5" out of 5 levels as in the case of the normal-temperature display state 23. Here, the accumulation counter 102 (an accumulation counter for luminance control) starts counting.

In a case where the battery thermistor temperature T becomes less than "T0" in the high-temperature display state 22, the accumulation counter 102 is reset, and then the display state changes to the normal-temperature display state 23 again.

In contrast, in the high-temperature display state 22, in a case where the battery thermistor temperature T does not fall below "T0" and the accumulated value (counter value) of the accumulation counter 102 exceeds a given value, i.e., in a case where the accumulated value is over a given accumulated counter value for temperature control, the display state changes to the display MIN setting state 21.

The display MIN setting state 21 is a display state in the electric power saving mode. In this state, a set value of the backlight is a MIN value ("1" out of 5 levels), and it is shown in a pop-up display that the display state is the display MIN setting state. In this state, in a case where the battery thermistor temperature T falls below "T0", the accumulation counter for temperature control is reset, and then the display state changes to the normal-temperature display state 23.

<Temperature Accumulation Counter Control Process (2)>

Figure 8:
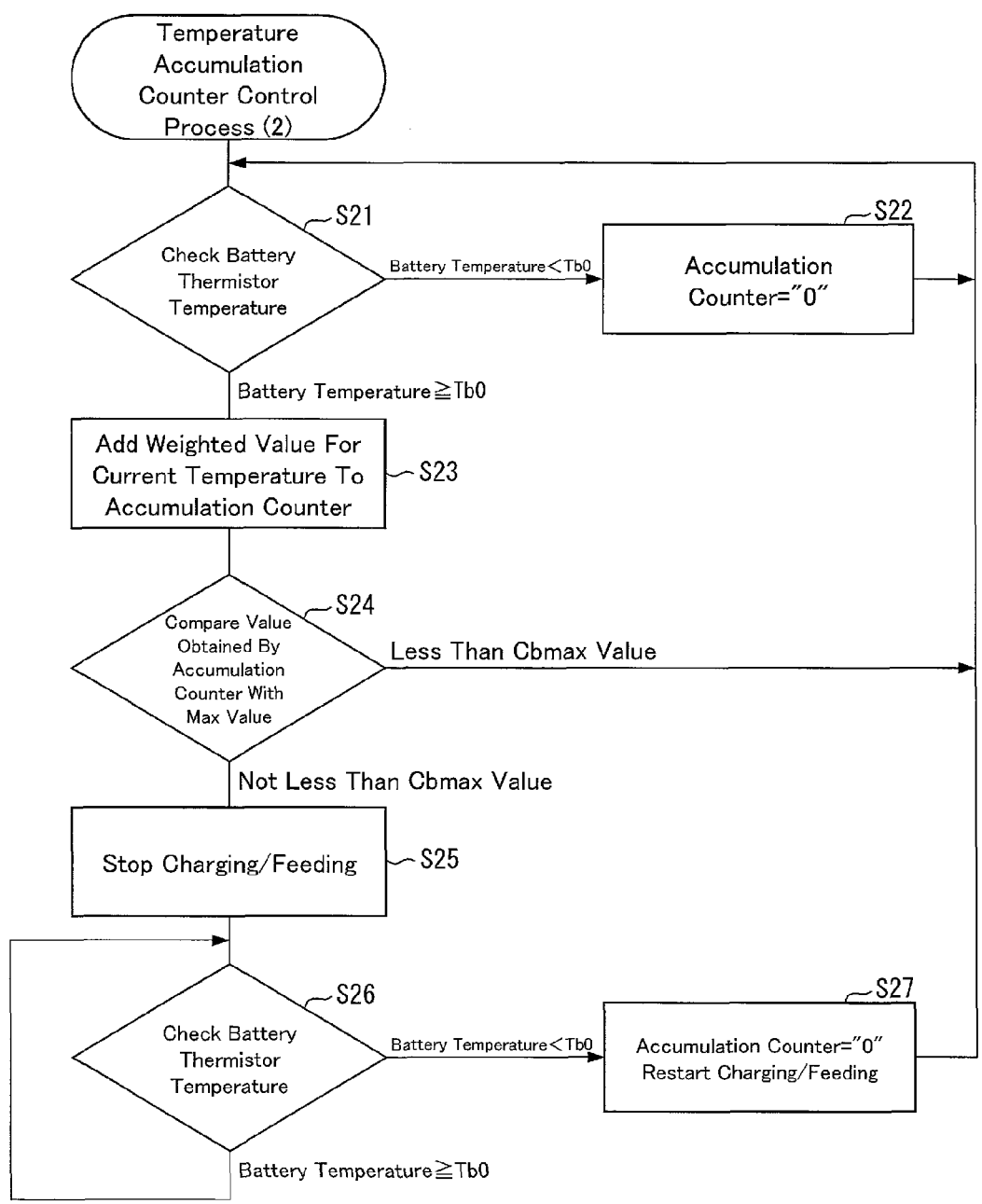
FIG. 8 is a flowchart illustrating how the temperature accumulation counter control process is carried out by use of the table shown in FIG. 7.

The following will specifically discuss, with reference to FIGS. 7 and 8, another example of a specific temperature accumulation counter control process carried out in the electric power control section 100. Here, charging/feeding stop control to be carried out with respect to the battery section 4 is described.

FIG. 7 shows an example of weighting carried out with respect to a temperature until the charging/feeding stop control is carried out with respect to the battery section 4. Here, a table is used in which the temperature of the battery section 4 corresponds to a counter weight. However, the table shown in FIG. 7 is different from the table shown in FIG. 4 in that the accumulation count is carried out at intervals of 10 seconds. In other words, in a case where this table is used, it is assumed that the accumulation count is carried out at every 10 seconds. Note that numerical values in the table are set for each device and in view of, for example, a place in which a temperature is detected.

FIG. 8 illustrates how a process is carried out in which in response to a rise in battery temperature due to operation of a mobile phone, the accumulation counter starts accumulating temperature damage, and then charging/feeding is stopped when an accumulated counter value is over a given value. Such control realizes (i) a decrease in terminal temperature accompanied by a decrease in power consumption and (ii) a forced reduction in voltage at a hazardous temperature caused by continuous operation.

First, as shown in FIG. 8, the temperature of the thermistor of the battery section 4 is checked (step S21). Here, more electric power is consumed by using a plurality of modules (the camera section 6, the LCD display section 8, etc.) of a main body of a mobile phone, and the temperature of the battery section 4 rises accordingly. Therefore, in order to check the temperature of the battery section 4, the temperature of the thermistor is checked.

As a result of the checking of the temperature of the thermistor at step S21, in a case where the temperature does not exceed a preset temperature "Ta0", a value of the accumulation counter 102 is reset to "0" (step S22). Subsequently, the process returns to step S21, at which the temperature of the thermistor of the battery section 4 is checked again.

In contrast, as a result of the checking of the temperature of the thermistor at step S21, in a case where the temperature is not less than the preset temperature "Ta0", the accumulation counter 102 adds a weighted value for a current temperature (step S23). Here, weighted values for respective temperatures are read out from the table shown in FIG. 7, and the accumulation counter 102 accumulates the weighted values thus read out.

Subsequently, it is determined whether or not a value obtained by the accumulation counter 102 is a Max value (a Camax value) (step S24). Here, in a case where the value obtained by the accumulation counter 102 is less than the Camax value, the process returns to step S21, at which the temperature of the thermistor of the battery section 4 is checked, and then accumulation is continued.

Meanwhile, at step S24, in a case where the value obtained by the accumulation counter 102 is not less than the Camax value, the charging/feeding stop process is carried out with respect to the battery section 4 (step S25). Here, the electric power mode changes from the normal electric power mode to the electric power saving mode, which causes the voltage supply/charging control section 5 that controls the battery section 4 to stop feeding for charging the battery section 4.

Thereafter, the temperature of the thermistor of the battery section 4 is checked (step S26). As a result of the checking of the temperature of the thermistor, in a case where the temperature does not exceed the preset temperature "Ta0", the value of the accumulation counter 102 is reset to "0". Then, charging/feeding with respect to the battery section 4 is restarted by changing the electric power mode from the electric power saving mode to the normal electric power mode (step S27). The process returns to step S21, at which the temperature of the thermistor of the battery section 4 is checked again.

In contrast, as a result of the checking of the temperature of the thermistor at step S26, in a case where the temperature is not less than the preset temperature "Ta0", until the temperature of the thermistor becomes less than "Ta0", the checking of the temperature of the thermistor is continued while the charging/feeding with respect to the battery section 4 is being stopped.

<Explanation of Change of Charging/Feeding State>

Figure 9:
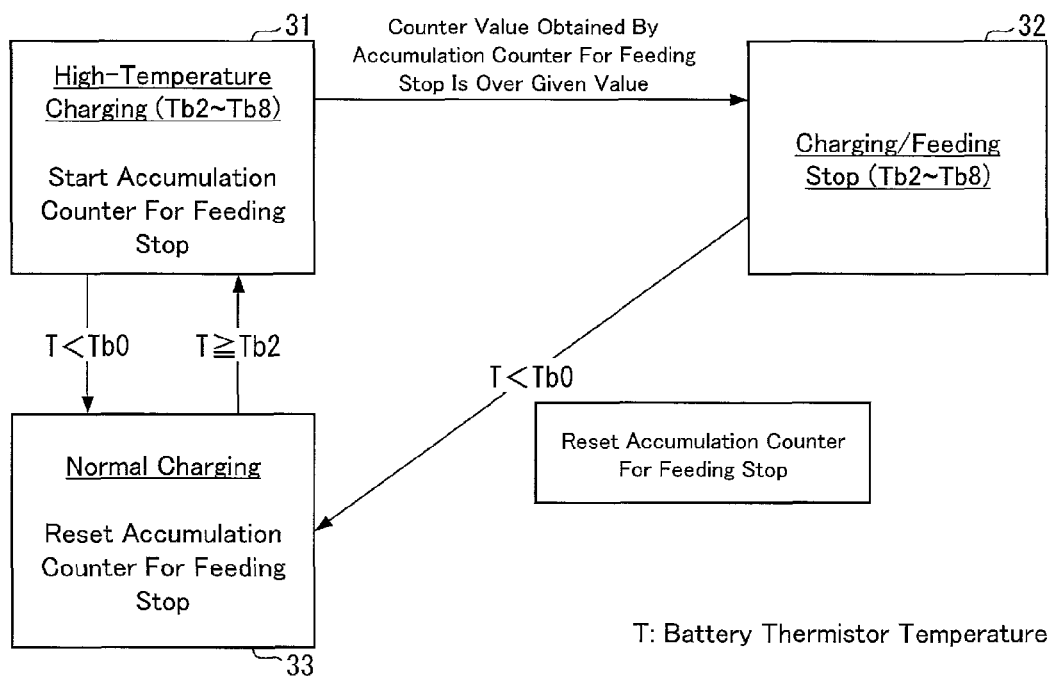
FIG. 9 is illustrates a change of a display state during the temperature accumulation counter control process shown in FIG. 8.

FIG. 9 illustrates a change of a charging/feeding state in the temperature accumulation counter control process.

In other words, the temperature accumulation counter control process causes a state of the charging/feeding with respect to the battery section 4 to be any one of display states that are a normal charging state 33, a high-temperature charging state 31, and a charging/feeding stop state 32.

The normal charging state 33 is a charging state in the normal electric power mode. In this state, the accumulation counter 102 (an accumulation counter for feeding stop) is reset. In a case where a battery thermistor temperature T becomes not less than "Tb2" in this state, the charging state changes to the high-temperature electric charging state 31.

The high-temperature charging state 31 is a charging state in the normal electric power mode and at the battery thermistor temperature T between "Tb2" and "Tb8". Here, the accumulation counter 102 (accumulation counter for feeding stop) starts counting.

In a case where the battery thermistor temperature T becomes less than "T0" in the high-temperature charging state 31, the accumulation counter 102 is reset, and then the charging state changes to the normal charging state 33 again.

In contrast, in the high-temperature charging state 31, in a case where the battery thermistor temperature T does not fall below "Tb0" and the accumulated value (the counter value) of the accumulation counter 102 exceeds a given value, i.e., in a case where an accumulated counter value is over a given value, the charging state changes to the charging/feeding stop state 32.

The charging/feeding stop state 32 is a charging/feeding state in the electric power saving mode. In a case where the battery thermistor temperature T falls below "Tb0", the accumulation counter for feeding stop is reset, and then the charging state changes to the normal charging state 33.

<Explanation of Advantageous Effects of Invention>

As described earlier, according to the present invention, accumulation counter weighting is managed by use of a table in which weighting counter is set at every 1° C. of a battery temperature (see FIGS. 4 and 7). Therefore, unlike conventional electric power control, according to electric power control of the present invention, it is possible to reduce a case where occurrence of a low-temperature burn cannot be prevented.

Figure 10:
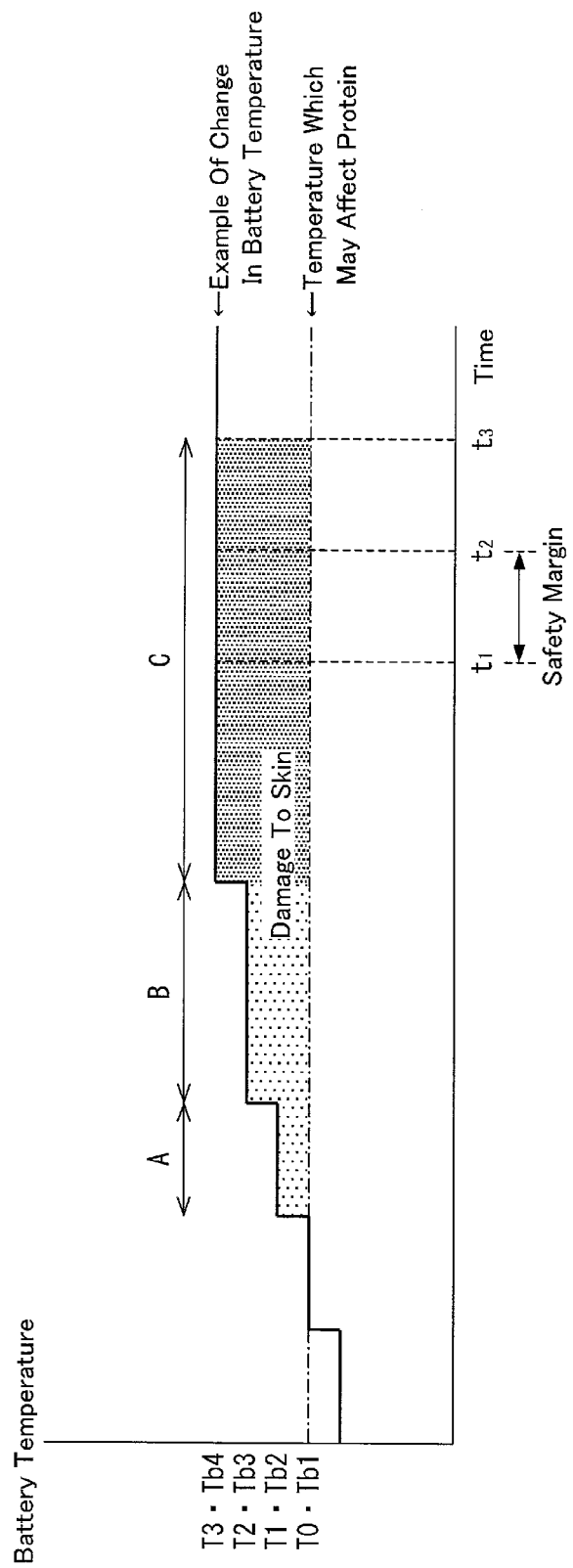
FIG. 10 is a graph for explaining an effect of the present invention, the graph showing a relationship between a battery temperature and a time.

For example, as shown in FIG. 10, damage to a human skin is accumulated, as time passes, from the battery temperature "T0" or "Tb1" which may affect protein. In a case where a low-temperature burn affects at the battery temperature "T3" or "Tb4", according to the conventional electric power control, electric power supply is stopped at t3 which is an elapsed time passed from t0 and at which the battery temperature reaches "T3" or "Tb4". However, since such electric power control does not consider damage to a skin caused by times at which the battery temperature reaches, for example, "T2" or "Tb3" and "T1" or "Tb2", respectively, before reaching "T3" or "Tb4", a low-temperature burn may occur in a case where the electric power supply is stopped at t3.

Actually, the damage to a human skin at "T2", "Tb3", and "T1" or "Tb2" is accumulated. Therefore, it is considered that a low-temperature burn occurs at t2 before the elapsed time t3.

In contrast, according to the present invention, accumulation counting is started, by use of an accumulation counter, at a battery temperature at which a human skin suffers damage and which has not been considered before. This makes it possible to actually carry out control such that the electric power supply is stopped at t1 before an elapsed time t2 at which the battery temperature reaches at "T3" or "Th4" and a low-temperature burn may occur. As a result, a low-temperature burn can be prevented without fail.

The present invention thus realizes easier temperature control at lower cost by carrying out accumulation of temperature damage with respect to an actual change in surface temperature of a device.

Therefore, the present invention brings about an effect of allowing a mobile terminal such as a mobile phone, in which a temperature sharply changes depending on an environment and/or heat generation of a device itself, to easily avoid a risk of occurrence of a low-temperature burn while maintaining convenience and conventional temperature control.

Note that according to the present embodiment, electric power supply to a device is controlled by detecting the temperature of the battery section 4 which is contained in a casing of a mobile phone. However, electric power supply control of the present invention is not limited to this. The electric power supply to a device can be controlled by directly detecting a temperature of a surface of a casing of a mobile phone.

In brief, according to the present invention, it is only necessary that a mobile terminal such as a mobile phone be capable of determining whether or not a temperature of a part of the mobile terminal which part a user directly touches is so high as to cause a low-temperature burn. Therefore, a temperature to be detected may be a temperature of the battery section 4 or the like provided inside a casing of a mobile phone, or a temperature of a surface of the casing of the mobile phone. Therefore, a temperature of any part of the mobile terminal may be detected provided that a temperature of a part of the mobile terminal which part a user directly touches and an influence of the temperature can be suitably evaluated.

Another Embodiment

The above description has discussed electric power control that is carried out by using, as an accumulated value obtained by the accumulation counter 102, a value obtained by the accumulation of weighted values corresponding to respective temperatures (see FIGS. 4 and 7).

Note that the accumulated value obtained by the counting by the accumulation counter 102 of the weighted values shown in each of FIGS. 4 and 7 at a constant sampling time (5 seconds in FIG. 4 and 10 seconds in FIG. 7).

However, a method of the present invention for finding the accumulated value is not limited to a method described above. It is also possible to use, as the accumulated value, a value obtained by counting the number of samplings by changing a sampling time but not changing weighted values for respective temperatures.

For example, the sampling time may be set to be shorter as a temperature is higher. Also in this case, it is possible to minimize, as much as possible, damage to a skin of a human body which touches a device, and consequently to reduce or stop electric power supply to a device before a low-temperature burn occurs.

Specifically, such control as described below is carried out.

<Temperature Accumulation Counter Control Process (3)>

FIG. 11 shows an example of a change in sampling time before carrying out control for causing the LCD luminance to be MIN (minimum). Here, a table is used in which the temperature of the battery section 4 and a sampling time correspond to each other. Note that numerical values in the table are set for each device in view of, for example, a place in which a temperature is detected. It is assumed in the table that an accumulation counter value is +10.

Figure 12:
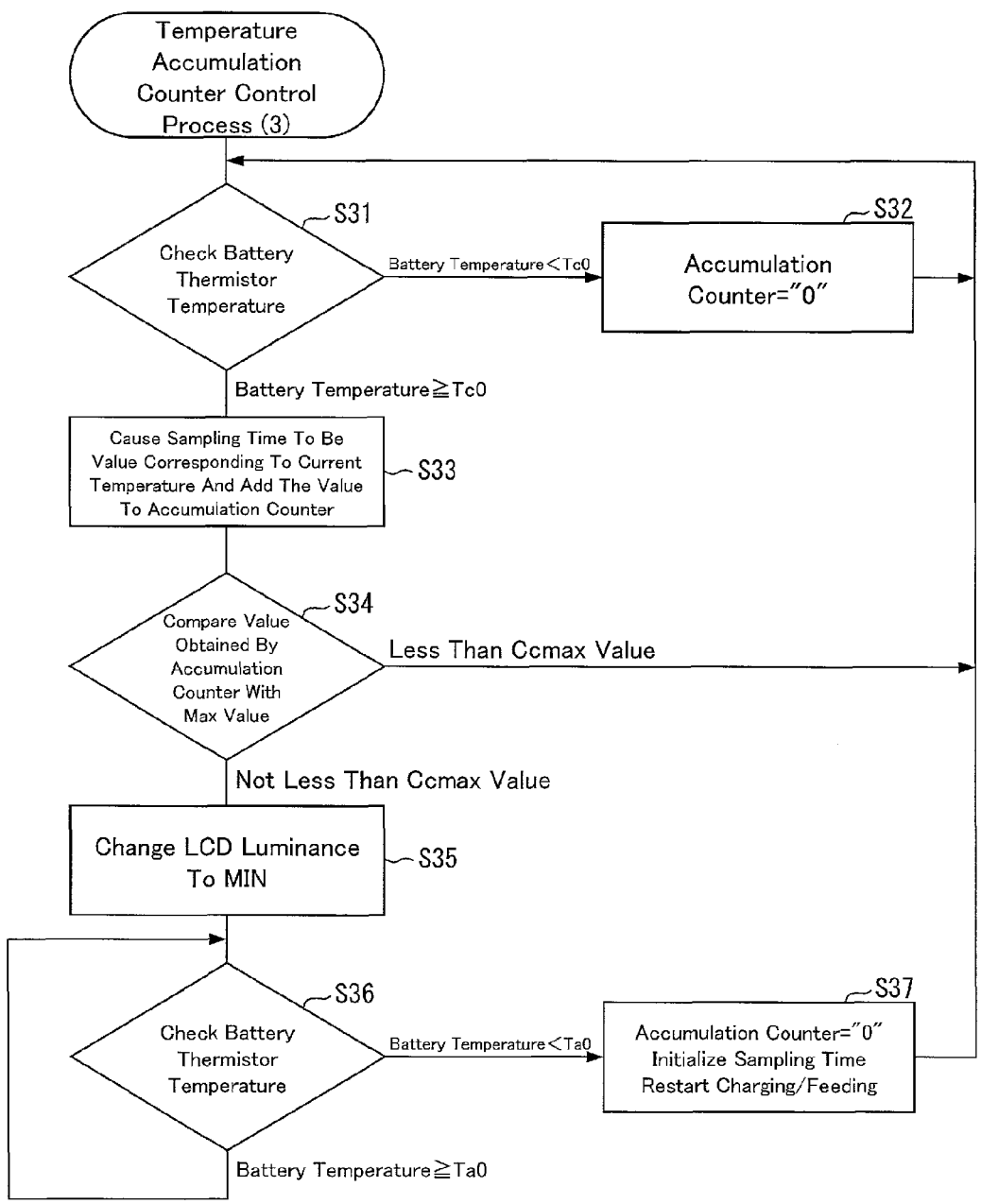
FIG. 12 is a flowchart illustrating how the temperature accumulation counter control process is carried out by use of the table shown in FIG. 11.

FIG. 12 illustrates how a process is carried out in which in response to a rise in battery temperature due to operation of a terminal, the accumulation of temperature damage is started at a sampling time in accordance with a corresponding temperature, and then the luminance at which the LCD carries out display is lowered to MIN when an accumulated counter value is over a given value. Such control allows a terminal temperature to be lower by reducing electric power consumption.

First, as shown in FIG. 12, the temperature of the thermistor of the battery section 4 is checked (step S31). Here, more electric power is consumed by using a plurality of modules (the camera section 6, the LCD display section 8, etc.) of a main body of a mobile phone, and the temperature of the battery section 4 rises accordingly. Therefore, in order to check the temperature of the battery section 4, the temperature of the thermistor is checked.

As a result of the checking of the temperature of the thermistor at step S31, in a case where the temperature does not exceed a preset temperature "Ta0", a value of the accumulation counter 102 is reset to "0" (step S32). Subsequently, the process returns to step S11, at which the temperature of the thermistor in the battery section 4 is checked again.

In contrast, as a result of the checking of the temperature of the thermistor at step S31, in a case where the temperature is not less than the preset temperature "Ta0", the accumulation counter 102 adds a weighted value for a current temperature (step S33). Here, weighted values for respective temperatures corresponding to respective sampling times are read out from the table shown in FIG. 11, and the accumulation counter 102 accumulates the weighted values thus read out.

Subsequently, it is determined whether or not a value (an accumulated value) obtained by the accumulation counter 102 is a Max value (a Camax value) (step S24). Here, in a case where the value obtained by the accumulation counter 102 is less than the Camax value, the process returns to step S31, at which the temperature of the thermistor in the battery section 4 is checked, and then accumulation is continued.

Meanwhile, at step S34, in a case where the value of the accumulation counter 102 is not less than the Camax value, a process for changing the luminance of the LCD display section 8 to MIN is carried out (step S35). Here, the electric power mode changes from the normal electric power mode to the electric power saving mode, and electric power to be supplied to the backlight is reduced so that the luminance of the LCD display section 8 becomes MIN with respect to the LCD control section 9 which controls the LCD display section 8.

Thereafter, the temperature of the thermistor of the battery section 4 is checked (step S36). As a result of the temperature checking of the temperature of the thermistor, in a case where the temperature does not exceed the preset temperature "Ta0", the value of the accumulation counter 102 is reset to "0". Then, in order to restart charging/feeding by initializing the sampling time, electric power supply is increased by changing the electric power mode from the electric power saving mode to the normal electric power mode (step S37). The process returns to step S31, at which the temperature of the thermistor of the battery section 4 is checked again.

In contrast, as a result of the checking of the temperature of the thermistor at step S36, in a case where the temperature is not less than the preset temperature "Ta0", until the temperature of the thermistor becomes less than "Ta0", the checking of the temperature of the thermistor is continued while the luminance MIN of the LCD display section 8 is being maintained.

Alternatively, electric power control may be carried out so that both a weighted value and a sampling time are changed for each temperature. In this case, it is possible to carry out electric power control with high accuracy.

Electric power control in combination with weighting by use of a sampling time and a temperature allows a line formed by steps of a rise in temperature to be close to a curved line. Such electric power control also brings about an effect of reducing electric power consumption by extension of a sampling time at a low temperature.

Specifically, such control as described below is carried out.

<Temperature Accumulation Counter Control Process (4)>

FIG. 13 shows an example of control that is carried out until charging/feeding is stopped by accumulation of sampling times and weighted values in accordance with respective temperatures. Here, a table is used in which the temperature of the battery section 4, counter weighting, and a sampling time correspond to one another.

Figure 14:
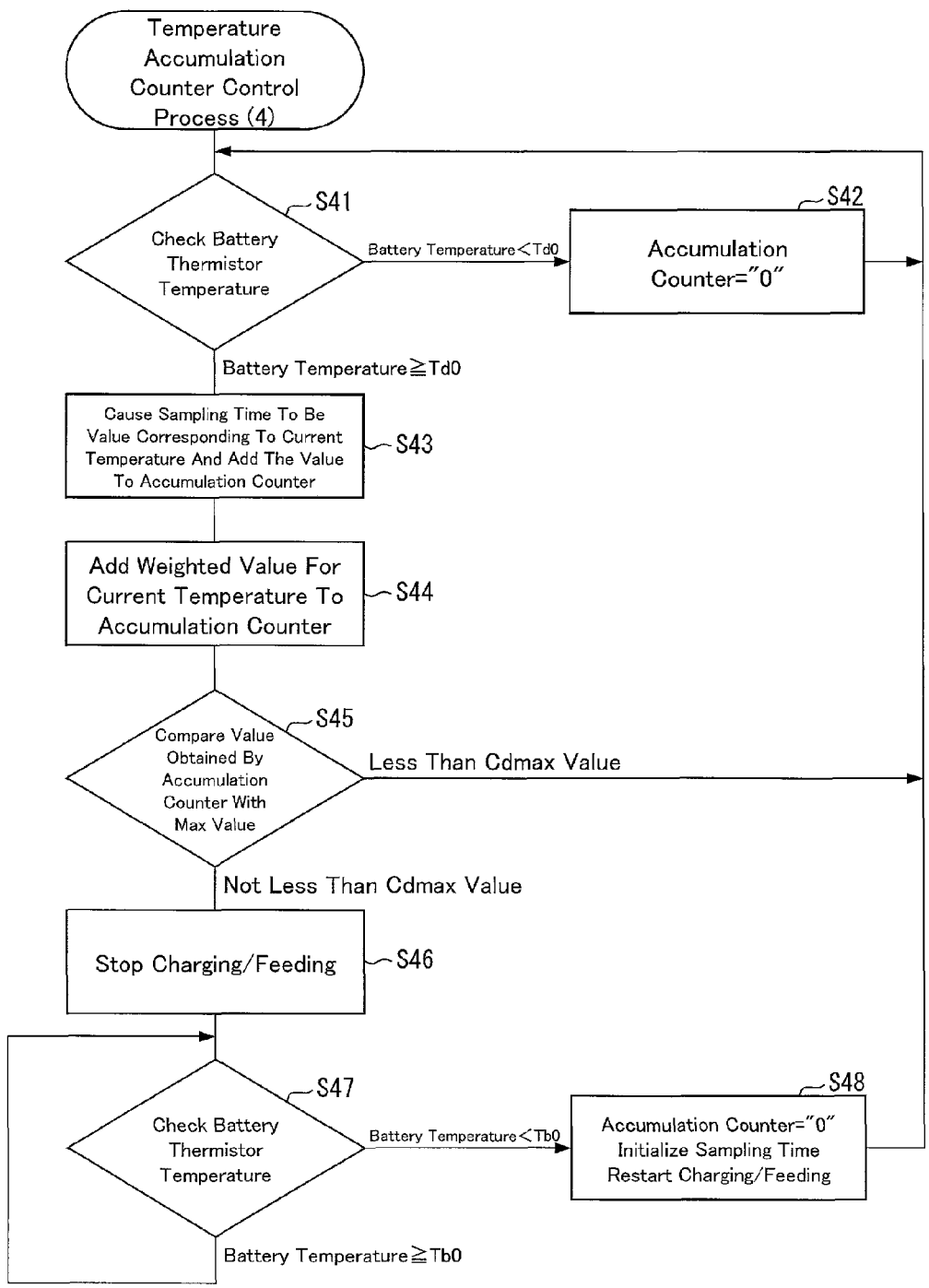
FIG. 14 is a flowchart illustrating how the temperature accumulation counter control process is carried out by use of the table shown in FIG. 13.

FIG. 14 illustrates how a process is carried out in which in response to a rise in battery temperature due to operation of a terminal, the accumulation counter starts accumulating temperature damage at a sampling time in accordance with a corresponding temperature, and then charging/feeding is stopped when an accumulated counter value is over a given value. Such control realizes (i) a decrease in terminal temperature accompanied by a decrease in power consumption, and (ii) a forced reduction in voltage at hazardous temperature caused by continuous operation.

First, as shown in FIG. 14, the temperature of the thermistor of the battery section 4 is checked (step S41). Here, more electric power is consumed by using a plurality of modules (the camera section 6, the LCD display section 8, etc.) of a main body of a mobile phone, and the temperature of the battery section 4 rises accordingly. Therefore, in order to check the temperature of the battery section 4, the temperature of the thermistor is checked.

As a result of the checking of the thermistor at step S41, in a case where the temperature does not exceed a preset temperature "Ta0", a value of the accumulation counter 102 is reset to "0" (step S42). Subsequently, the process returns to step S41, at which the temperature of the thermistor in the battery section 4 is checked again.

In contrast, as a result of the checking of the temperature of the thermistor at step S41, in a case where the temperature is not less than the preset temperature "Ta0", a value for the sampling time is changed to a value corresponding to a current temperature (step S43), and the accumulation counter 102 adds the weighted value for the current temperature (step S23). Here, respective values of the sampling times and the weighted values for respective temperatures are read out from the table shown in FIG. 13, and the accumulation counter 102 adds the weight values thus read out.

Subsequently, it is determined whether or not a value obtained by the accumulation counter 102 is a Max value (a Camax value) (step S45). Here, in a case where the value obtained by the accumulation counter 102 is less than the Camax value, the process returns to step S41, at which the temperature of the thermistor in the battery section 4 is checked, and then accumulation is continued.

Meanwhile, at step S45, in a case where the value of the accumulation counter 102 is not less than the Camax value, a process for stopping charging/feeding is carried out with respect to the battery section 4 (step S46). Here, the electric power mode changes from the normal electric power mode to the electric power saving mode, which causes the charging/feeding control section 5 to stop feeding for charging the battery section 4.

Thereafter, the temperature of the thermistor of the battery section 4 is checked (step S47). As a result of the checking of the temperature of the thermistor, in a case where the temperature does not exceed the preset temperature "Ta0", the value of the accumulation counter 102 is reset to "0". Then, charging/feeding with respect to the battery section 4 is restarted by changing the electric power mode from the electric power saving mode to the normal mode and initializing the sampling time (step S487). The process returns to step S41, at which the temperature of the thermistor in the battery section 4 is checked again.

In contrast, as a result of the checking of the temperature of the thermistor at step S47, in a case where the temperature is not less than the preset temperature "Ta0", until the temperature of the thermistor becomes less than "Ta0", the checking of the temperature of the thermistor is continued while the charging/feeding with respect to the battery section 4 is being stopped.

<Program and Recording Medium>

Finally, it is only necessary that the electric power control section 100 included in the microcomputer 1 of the mobile phone be realized by a hardware logic. Alternatively, the electric power control section 100 may also be realized by software by use of a CPU (Central Processing Unit) as below.

Namely, the electric power control section 100 includes (i) a CPU such as MPU which executes a command of a program that implements each function of the electric power control section 100, (ii) a ROM (Read Only Memory) in which the program is stored, (iii) a RAM (Random Access Memory) which extracts the program in executable form, and (iv) a storage device such as a memory in which the program and various sets of data are stored.

The above program is an electric power control program and is configured as below.

An electric power control program of the present invention causes a computer to carry out the steps of: (a) detecting temperatures of a device; (b) accumulating numerical values assigned to the respective temperatures of the device which have been detected by the step (a); and (c) carrying out electric power control for reducing or stopping the electric power supply to the device when an accumulated value obtained by the step (b) exceeds a preset value.

The electric power control program for realizing the electric power control section 100 is achievable, not only in a case where the electric power control program is fixedly carried by a program memory, but also in a case where a recording medium in which recording program codes (an executable program, an intermediate code program, and a source program) of the program is supplied to the power controlling section 100 and then the electric power control section 100 reads out the program codes recorded in the recording medium.

The recording medium is not limited to a recording medium of a specific structure or type. Namely, examples of the recording medium include (i) tapes such as a magnetic tape and a cassette tape, (ii) disks including magnetic disks such as a Floppy (Registered Trademark) disk and a hard disk, and optical disks such as a CD-ROM, an MO, an MD, a DVD, and a CD-R, (iii) cards such as an IC card (including a memory card) and an optical card, and (iv) semiconductor memories realized by a mask ROM, EPROM, EEPROM, a flash ROM, and the like.

The object of the present invention can also be achieved by allowing the electric power control section 100 to be connected to a communication network. In this case, the program codes are supplied to the electric power control section 100 via a communication network. It is only necessary that the communication network be capable of supplying the program codes to the electric power control section 100. The communication network is not limited to a communication network of a specific type or form. Examples of the communication network includes the Internet, an intranet, an extranet, a LAN, ISDN, VAN, a CATV communications network, a virtual private network, a telephone network, a mobile telecommunications network, and a satellite communication network.

A transmission medium of which a communication network is composed is not particularly limited. Examples of the transmission medium includes wired transmission media such as IEEE1394, a USB, a power-line carrier, a cable TV circuit, a telephone line, and ADSL (Asymmetric Digital Subscriber Line) and wireless transmission media such as infrared communication systems such as IrDA and a remote controller, Bluetooth (Registered Trademark), 802.11 wireless communication system, HDR, a mobile phone network, a satellite circuit, and a digital terrestrial network. Note that the present invention can also be realized in a form of a computer data signal in which the program codes are embodied by an electronic transmission and which is embedded in carrier waves.

Note that the electric power saving mode described in the present embodiment encompasses not only the examples described above but also control which allows electric power saving by various means. For example, it is possible to carry out such control by providing a one-segment DTV module 13, a WLAN control module 14, and a CPU with respective thermistors. In a case where the CPU carries out a process such as moving image encoding/decoding in which a large amount of calculation is carried out at a high speed, more electric power is consumed and also a larger amount of heat is generated. In such a case, it may be possible to limit a use of the CPU for moving image encoding/decoding or to lower an operation clock of the CPU by detecting the temperature of the thermistor provided to the CPU.

It is preferable that: the numerical values assigned to the respective temperatures be weighted values obtained by weighting with respect to the respective temperatures; and the accumulation means calculate, as the accumulated value, a value obtained by accumulating the weighted values.

This case brings about an effect of (i) preventing a low-temperature burn without fail and (ii) preventing a loss of user's convenience by causing the weighted values to clearly differ in level between a temperature which causes no low-temperature burn and a temperature which causes a low-temperature burn.

It is preferable that: the numerical values assigned to the respective temperatures be sampling times set for the respective temperatures; and the accumulation means calculate, as the accumulated value, a count value obtained by counting at the sampling times.

This case brings about an effect of (i) preventing a low-temperature burn without fail and (ii) preventing a loss of user's convenience by causing the sampling times to clearly differ in level between a temperature which causes no low-temperature burn and a temperature which causes a low-temperature burn.

Further, it is possible to cause a computer to carry out the above electric power control.

Namely, an electric power control program of the present invention causes a computer to carry out the steps of: (a) detecting temperatures of a device; (b) accumulating numerical values assigned to the respective temperatures of the device which have been detected by the step (a); and (c) carrying out electric power control for reducing or stopping the electric power supply to the device when an accumulated value obtained by the step (b) exceeds a preset value.

Moreover, the electric power control program may be recorded in a computer-readable recording medium.

In this case, it is possible to carry out the electric power control program of the present invention by a highly versatile computer.

The present invention is not limited to the description of embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be used for general electronic devices which are mobile terminals such as a mobile phone, a PDA (Personal Digital Assistant), a laptop computer, an electronic book reader, and the like, and are operated by being actually held by users.

REFERENCE SIGNS LIST

1 Microcomputer
2 External Feeding Cable
3 USB Connector
4 Battery Section
5 Voltage Supply/Charging Control Section
6 Camera Section
7 Camera Control Section
8 LCD Display Section
9 LCD Control Section
10 Built-in Memory
11 Memory Card
12 Non-contact IC Card Control Section
13 One-segment DTV Module
14 WLAN Control Module
15 Touch Panel Input Section
16 Vibrator
17 External Speaker
18 Handset Receiver
19 Handset Microphone
21 Wireless Control Module
22 Communication Control Section
100 Electric Power Control Section
101 Temperature Detecting Section
102 Accumulation Counter (Accumulation Means)
103 Electric Power Supply Amount Setting Section

The invention claimed is:

1. An electric power control apparatus for controlling electric power supply to a device, comprising:
  temperature detecting means for detecting temperatures of the device; and
  accumulation means for accumulating numerical values assigned to the respective temperatures of the device which have been detected by the temperature detecting means,
  the electric power control apparatus reducing the electric power supply to the device when an accumulated value obtained by the accumulation means exceeds a preset value, wherein:
  the numerical values assigned to the respective temperatures are sampling times set for the respective temperatures; and
  the accumulation means calculates, as the accumulated value, a count value obtained by counting at the sampling times.

2. The electric power control apparatus as set forth in claim 1, wherein:
  the numerical values assigned to the respective temperatures are weighted values obtained by weighting with respect to the respective temperatures; and
  the accumulation means calculates, as the accumulated value, a value obtained by accumulating the weighted values.

3. An electric power control method for controlling electric power supply to a device, comprising the steps of:
  (a) detecting temperatures of the device;
  (b) accumulating numerical values assigned to the respective temperatures of the device which have been detected by the step (a); and
  (c) carrying out electric power control for reducing or stopping the electric power supply to the device when an accumulated value obtained by the step (b) exceeds a preset value, wherein:
  the numerical values assigned to the respective temperatures are sampling times set for the respective temperatures; and
  the accumulating step calculates, as the accumulated value, a count value obtained by counting at the sampling times.

4. A computer-readable recording medium in which an electric power control program for causing a computer to carry out the steps of:
  (a) detecting temperatures of a device;
  (b) accumulating numerical values assigned to the respective temperatures of the device which have been detected by the step (a); and
  (c) carrying out electric power control for reducing or stopping the electric power supply to the device when an accumulated value obtained by the step (b) exceeds a preset value is recorded, wherein:
  the numerical values assigned to the respective temperatures are sampling times set for the respective temperatures; and
  the accumulating step calculates, as the accumulated value, a count value obtained by counting at the sampling times.

* * * * *